(12) United States Patent
Kanaya

(10) Patent No.: US 11,148,477 B2
(45) Date of Patent: Oct. 19, 2021

(54) HEAVY-DUTY PNEUMATIC TIRE

(71) Applicant: Sumitomo Rubber Industries, Ltd., Kobe (JP)

(72) Inventor: Yoshiki Kanaya, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 420 days.

(21) Appl. No.: 16/169,658

(22) Filed: Oct. 24, 2018

(65) Prior Publication Data

US 2019/0143760 A1 May 16, 2019

(30) Foreign Application Priority Data

Nov. 14, 2017 (JP) .............................. JP2017-218680

(51) Int. Cl.
*B60C 15/00* (2006.01)
*B60C 15/06* (2006.01)
(Continued)

(52) U.S. Cl.
CPC ............ *B60C 15/0045* (2013.01); *B60C 3/04* (2013.01); *B60C 9/04* (2013.01); *B60C 9/1835* (2013.01); *B60C 9/2006* (2013.01); *B60C 15/05* (2013.01); *B60C 15/0603* (2013.01); *B60C 9/185* (2013.01); *B60C 2009/0223* (2013.01);
(Continued)

(58) Field of Classification Search
CPC . B60C 15/0045; B60C 15/05; B60C 15/0603; B60C 2015/0614; B60C 2015/061; B60C 2015/042; B60C 2015/044; B60C 2015/0678; B60C 2200/06; B60C 9/04; B60C 9/1835; B60C 9/2006; B60C 9/185; B60C 2009/0223;
(Continued)

(56) References Cited

U.S. PATENT DOCUMENTS 5,526,863 A * 6/1996 Hodges ............... B60C 15/0018
152/541
5,820,711 A * 10/1998 Sakamoto .................. B60C 9/08
152/549
(Continued)

FOREIGN PATENT DOCUMENTS

DE 102013103026 A1 * 9/2014 ............... B60C 5/14
JP 2008-87710 A 4/2008

*Primary Examiner* — Justin R Fischer
*Assistant Examiner* — Philip N Schwartz
(74) *Attorney, Agent, or Firm* — Birch, Stewart, Kolasch & Birch, LLP

(57) ABSTRACT

A heavy-duty pneumatic tire includes a section width being equal to or less than 335 mm, an aspect ratio being equal to or less than 55%, and a toroidal carcass extending between axially spaced bead portions through a tread portion and sidewall portions, wherein the carcass includes a carcass ply which includes a main portion and a turn-up portion, a belt layer disposed radially outward of the carcass in the tread portion, a sidewall rubber defining an outer sidewall profile of each sidewall portion, and a chafer rubber defining an outer bead profile of each bead portion, wherein in each bead portion, on a straight line that is perpendicular to the main portion of the carcass ply and passes a radially inner end of the sidewall rubber, the chafer rubber has a thickness of from 40% to 60% of a thickness of the bead portion.

15 Claims, 2 Drawing Sheets

(51) Int. Cl.
*B60C 9/04* (2006.01)
*B60C 9/18* (2006.01)
*B60C 15/05* (2006.01)
*B60C 9/20* (2006.01)
*B60C 3/04* (2006.01)
B60C 15/04 (2006.01)
B60C 9/02 (2006.01)

(52) U.S. Cl.
CPC ............... *B60C 2009/0425* (2013.01); *B60C 2009/0441* (2013.01); *B60C 2009/0475* (2013.01); *B60C 2009/1878* (2013.01); *B60C 2015/042* (2013.01); *B60C 2015/044* (2013.01); *B60C 2015/061* (2013.01); *B60C 2015/0614* (2013.01); *B60C 2015/0678* (2013.01); *B60C 2200/06* (2013.01)

(58) Field of Classification Search
CPC .... B60C 2009/0425; B60C 2009/0475; B60C 2009/1878; B60C 2009/0441; B60C 3/04
See application file for complete search history.

(56) References Cited

U.S. PATENT DOCUMENTS

| | | | |
|---|---|---|---|
| 6,053,229 A * | 4/2000 | Suzuki | B29D 30/32 152/541 |
| 2012/0067487 A1* | 3/2012 | Duval | D07B 1/062 152/527 |
| 2016/0200150 A1* | 7/2016 | Yamamoto | B60C 11/00 152/541 |
| 2017/0015145 A1* | 1/2017 | Tanaka | B60C 15/0635 |

* cited by examiner

HEAVY-DUTY PNEUMATIC TIRE

BACKGROUND ART

Field of the Disclosure

The present disclosure relates to heavy-duty pneumatic tires, and more particularly to a heavy-duty pneumatic tire capable of improving bead durability.

Description of the Related Art

Recent years, in order to reduce tire weight as well as rolling resistance, it has been proposed for heavy-duty pneumatic tires for trucks, buses and the like to replace tire wheels each configured by a pair of double tires into a single wide tire having a low aspect ratio. For example, the following Patent document 1 discloses a low aspect heavy-duty pneumatic tire which comprises a carcass, a belt layer, and a sheeted cushion rubber layer disposed between the carcass and the belt layer.
[Patent Document 1]
Japanese Unexamined Patent Application Publication 2008-087710

SUMMARY OF THE DISCLOSURE

Unfortunately, when the above-mentioned structure of heavy-duty pneumatic tire is applied to a single wide tire having section widths equal to or less than 335 mm for small trucks and the like, the bead portions are prone to be broken around radially outer ends of the turn-up portions of the carcass, resulting in deterioration of bead durability extremely.

In view of the above problems in the conventional art, the present disclosure has a main object to provide a heavy-duty pneumatic tire having an ultra-high turn-up carcass structure which is capable of improving bead durability.

According to one aspect of the disclosure, a heavy-duty pneumatic tire includes a section width being equal to or less than 335 mm, an aspect ratio being equal to or less than 55%, a toroidal carcass extending between axially spaced bead portions through a tread portion and sidewall portions, wherein the carcass comprises a carcass ply comprising a main portion extending between bead cores each disposed in a respective one of the bead portions through the tread portion and the sidewall portions, and a turn-up portion turned up around each bead core of each bead portion from axially inside of the tire to outside of the tire and extending to a radially outer end thereof, a belt layer disposed radially outward of the carcass in the tread portion, wherein the radially outer end of the turn-up portion is located between the main portion and the belt layer in the tread portion, a sidewall rubber defining an outer sidewall profile of each sidewall portion, and a chafer rubber defining an outer bead profile of each bead portion, wherein in each bead portion, on a straight line that is perpendicular to the main portion of the carcass ply and passes a radially inner end of the sidewall rubber, the chafer rubber has a thickness of from 40% to 60% of a thickness of the bead portion.

In another aspect of the disclosure, the chafer rubber may have complex modulus of from 10 to 15 MPa.

In another aspect of the disclosure, the chafer rubber may include a bead toe portion located radially innermost of the tire, a bead base portion extending axially outwardly from the bead toe, and a bead heel portion located axially outermost of the bead base portion, each bead core may have a bead core reference position which is located radially innermost thereof, and in each bead portion, an axial distance between the bead toe portion and the bead core reference position may be in a range of from 30% to 40% of an axial distance between the bead toe portion and the bead heel portion.

In another aspect of the disclosure, the carcass ply may include steel cords having a cord diameter of from 0.6 to 0.8 mm.

In another aspect of the disclosure, the steel cords may be arranged so as to have from 20 to 30 ends per 50 mm width of the carcass ply.

In another aspect of the disclosure, the heavy-duty pneumatic tire may further include a cushion rubber disposed between the main portion of the carcass ply and each edge of the belt layer, wherein the cushion rubber may extend to a radially inner end thereof located radially inwardly of the radially outer end of the turn-up portion.

In another aspect of the disclosure, the heavy-duty pneumatic tire may further include a tapered bead apex rubber in each bead portion, wherein the bead apex rubber may extend radially outwardly from the bead core to a radially outer end thereof between the main portion and the turn-up portion, and in each bead portion, a radial distance between the radially inner end of the cushion rubber and the radially outer end of the bead apex rubber may be in a range of from 25% to 35% of a product of the section width and the aspect ratio.

DESCRIPTION OF THE PREFERRED EMBODIMENTS

An embodiment of the present disclosure will be explained below with reference to the accompanying drawings.

Figure 1:
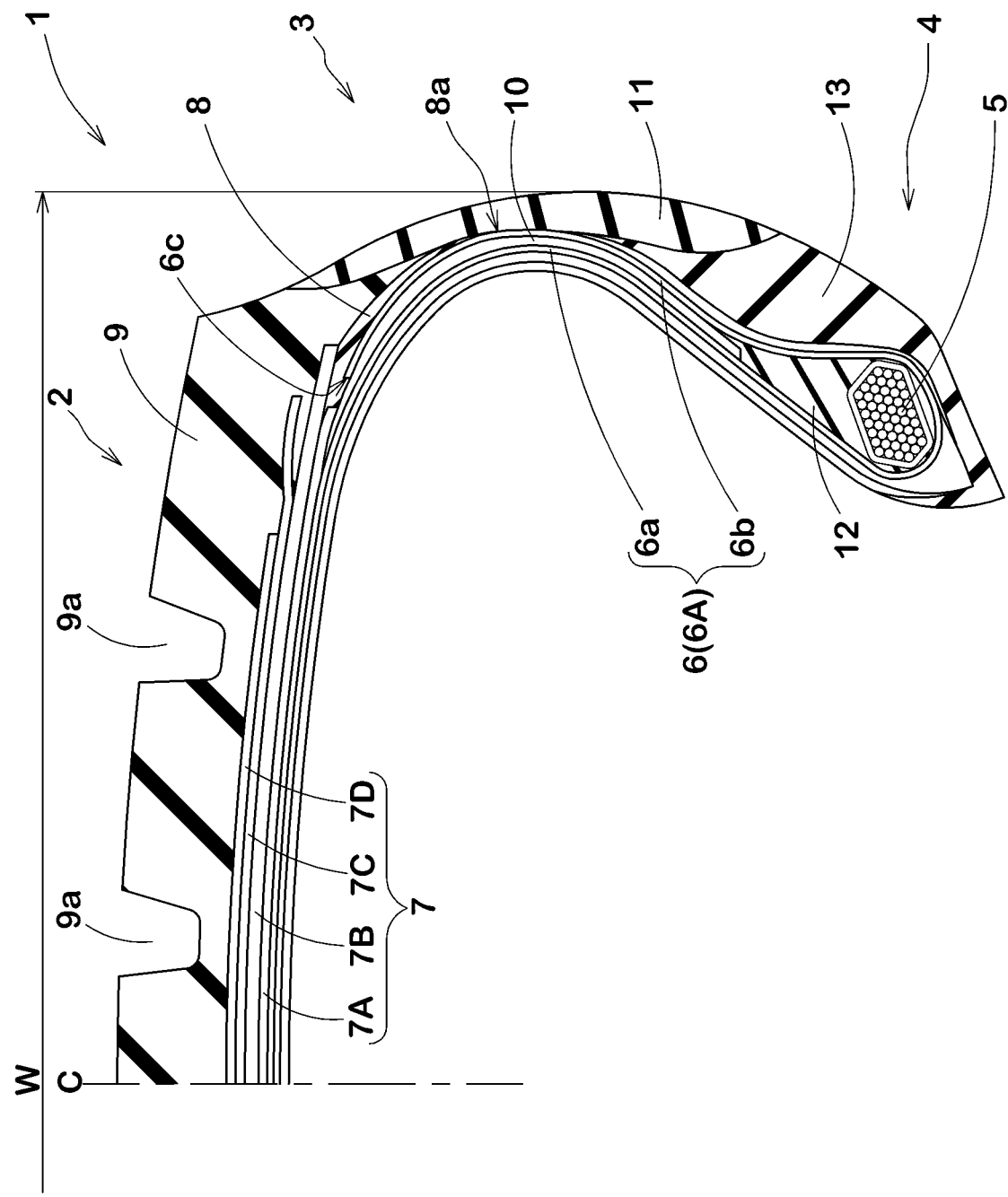
FIG. 1 is a cross-sectional view of a heavy-duty pneumatic tire according to an embodiment of the disclosure.

FIG. 1 is a meridian cross-sectional view of a heavy-duty pneumatic tire (hereinafter, simply referred to as "tire") 1 under a standard state in accordance with an embodiment of the disclosure.

As used herein, the standard state is such that the tire 1 is mounted on a standard wheel rim (not illustrated) with a standard pressure but is loaded with no tire load. Unless otherwise noted, dimensions of respective portions of the tire 1 are values measured under the standard state.

As used herein, the standard wheel rim is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the standard pressure is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tire 1 according to the embodiment has a section width W of equal to or less than 335 mm and an aspect ratio of equal to or less than 55%, and the tire 1 may suitably be embodied as a so-called single wide tire for small trucks and the like. As used herein, "section width" is a maximum axial distance between the outside of sidewall portions 3 of the tire 1 under the standard state (exclusive of protruding letters and decorations of the sidewalls 3).

As used herein, "aspect ratio" is a ratio of a section height to the section width of the tire 1. As used herein, the "section height" is one-half of difference between the outer diameter of the tire 1 and the rim diameter of a standard wheel rim.

In this embodiment, the tire 1 includes a tread portion 2, the sidewall portions 3, axially spaced bead portions 4, a toroidal carcass 6 extending between bead cores 5 each disposed in a respective one of the bead portions 4 through the tread portion 2 and the sidewall portions 3, and a belt layer 7 disposed radially outward of the carcass 6 in the tread portion 2. The carcass 6 includes at least one carcass ply 6A of cords. In this embodiment, the carcass 6 is constituted by a single carcass ply.

Preferably, the carcass ply 6A includes a main portion 6a and a pair of turn-up portions 6b. The main portion 6a extends between the bead cores 5 through the tread portion 2 and the sidewall portions 3. In this embodiment, each turn-up portion 6b is continuous to the main portion 6a, and is turned up around each bead core 5 from the axially inside to the outside of tire.

In this embodiment, each turn-up portion 6b is embodied as an ultra-high turn-up structure in which a radially outer end 6c of each turn-up portion 6b is located between the main portion 6a and the belt layer 7 in the tread portion 2. Since the radially outer end 6c of each turn-up portion 6b is located between the main portion 6a and the belt layer 7, breakage due to the radially outer end 6c can be suppressed, thus improving durability of the bead portions 4.

Preferably, the cords of carcass ply 6A may include steel cords having a cord diameter of from 0.6 to 0.8 mm. When the cord diameter is less than 0.6 mm, flexure around the sidewall portions 3 is prone to increase, some steel cords may be broken. When the cord diameter is more than 0.8 mm, strain between the turn-up portion 6b and the main portion 6a in each bead portion 4 is prone to increase, either turn-up portion 6b may be peeled off from the main portion 6a.

Preferably, the steel cords are arranged so as to have from 20 to 30 ends per 50 mm width of the carcass ply 6A. When the ends (i.e., the number of steel cords) per 50 mm width is less than 20, flexure around the sidewall portions 3 is prone to increase, some steel cords may be broken. When the number of steel cords per 50 mm width is more than 30, strain between the main portion 6a and the turn-up portion 6b in each bead portion 4 is prone to increase, either turn-up portion 6b may be peeled off from the main portion 6a.

Preferably, the steel cords are oriented at an angle of from 0 to 20 degrees with respect to a tire radial-plane direction (i.e., 70 to 90 degrees with respect to the tire equator C). As used herein, "tire radial-plane direction" is a direction along the shape of carcass ply in a plane including the rotation axis of the tire 1. The tire 1 including such steel cords results low rolling resistance which leads to economic fuel consumption.

In this embodiment, the belt layer 7 includes first to fourth belt plies 7A to 7D. These belt plies 7A to 7D, preferably, are configured to include steel cords. In this embodiment, the second belt ply 7B is located radially outwardly of the radially outer end 6c of each turn-up portion 6b. Such a belt layer 7 can increase rigidity of the tread portion 2 by hooping the carcass 6, resulting in improving durability of the tire 1.

In this embodiment, the tread portion 2 includes a cushion rubber 8 disposed between the main portion 6a of the carcass ply 6A and each edge of the belt layer 7. Preferably, in each sidewall portion 3, an axially inner end 8a of the cushion rubber 8 is located radially inwardly of the radially outer end 6c of the turn-up portion 6b. Preferably the cushion rubber 8 has complex modulus $E^*1$ of 2.5 to 4.5 MPa. As used herein, complex elastic modulus of rubbers forming the tire 1 was a value measured with a viscoelastic spectrometer under the following conditions: temperature of 70 degrees Celsius; frequency of 10 Hz; initial strain of 10%; and dynamic strain of 2%.

In this embodiment, the tread portion 2 includes a tread rubber 9 disposed radially outwardly of the belt layer 7 defining a radially outer profile of the tread portion 2. Preferably, the tread rubber 9 is provided with grooves 9a. Preferably, the tread rubber 9 has complex modulus $E^*2$ of from 5 to 7 MPa.

Figure 2:
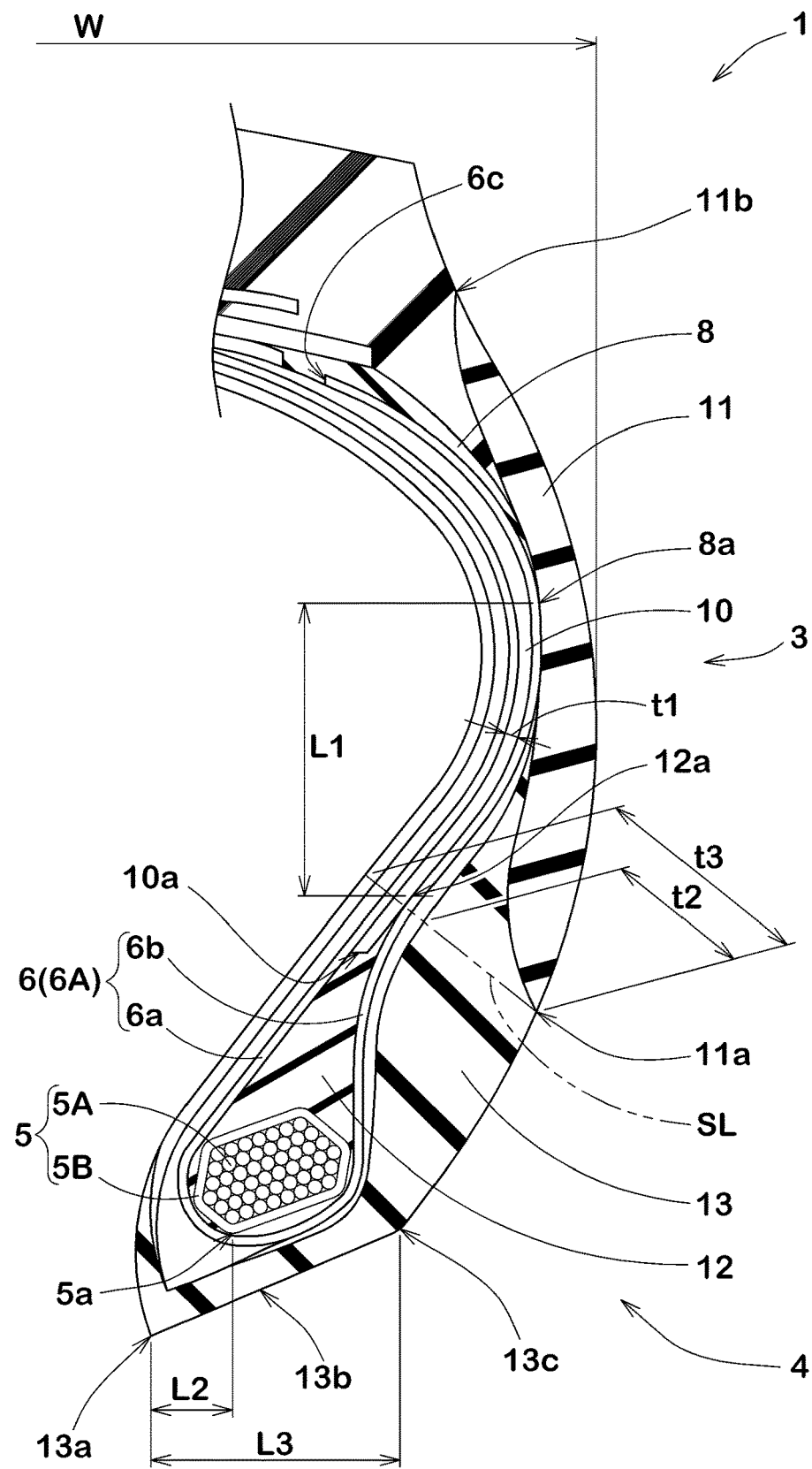
FIG. 2 is an enlarged view of a sidewall portion and a bead portion in FIG. 1.

FIG. 2 illustrates an enlarged view of one of the sidewall portions 3 and the bead portion 4 connected thereto. As illustrated in FIG. 2, in each sidewall portion 3, a sheeted rubber layer 10 is disposed between the main portion 6a and the turn-up portion 6b. Preferably, a radially inner end 10a of the sheeted rubber layer 10 is connected to a radially outer end of the bead apex rubber 12 which will be described later. Preferably, the sheeted rubber layer 10 extends radially outwardly to the radially outer end 6c of the turn-up portion 6b at least.

In general, the sidewall portions 3 having an ultra-high turn-up carcass structure are prone to increase strain amplitude which is a distribution of strain change in surfaces of the sidewall portions 3 between loaded and unloaded conditions. In each sidewall portion 3, the above-mentioned sheeted rubber layer 10 can reduce strain between the main portion 6a and the turn-up portion 6b, resulting in reducing strain amplitude of each sidewall portion 3.

Preferably, the sheeted rubber layer 10 has a thickness t1 of from 1.0 to 2.0 mm. When the thickness t1 of the sheeted rubber layer 10 is less than 1.0 mm, strain between the main portion 6a and the turn-up portion 6b may increase. When the thickness t1 of the sheeted rubber layer 10 is greater than 2.0 mm, the main portion 6a tends to be located axially inwardly, and thus increasing strain amplitude.

Preferably, the sheeted rubber layer 10 has complex modulus $E^*3$ of from 6 to 8 MPa. When the complex modulus $E^*3$ of the sheeted rubber layer 10 is less than 6 MPa, strain between the main portion 6a and the turn-up portion 6b in each sidewall 3 may increase. When the complex modulus $E^*3$ of the sheeted rubber layer 10 is greater than 8 MPa, the sheeted rubber layer 10 may be peeled off from the carcass 6 due to impact of traveling.

In this embodiment, each sidewall portion 3 includes a sidewall rubber 11 defining an outer sidewall profile of the sidewall portion 3. The sidewall rubber 11 is disposed axially outwardly of the turn-up portion 6b, and extends from a radially inner end 11a thereof to a radially outer end 11b thereof. Preferably, the sidewall rubber 11 has complex modulus $E^*4$ of from 3.0 to 5.5 MPa.

In this embodiment, each of the bead portions 4 includes the above-mentioned bead apex rubber 12 extending and tapering radially outwardly from the bead core 5, and a chafer rubber 13 defining an outer bead profile of the bead portion 4.

The bead apex rubber 12, for example, has a substantially triangular cross-sectional shape that extends radially outwardly from the bead core 5 between the main portion 6a and the turn-up portion 6b. The bead apex rubber 12 has complex modulus E*5 of from 50 to 80 MPa.

Preferably, a radially outer end 12a of the bead apex rubber 12 is located radially outwardly of the inner end 10a of the sheeted rubber layer 10. Preferably, in each sidewall portion 3, a radial distance L1 between the inner end 8a of the cushion rubber 8 and the outer end 12a of the bead apex rubber 12 is in a range of from 25% to 35% of the section height that is a product of the section width W and the aspect ratio of the tire.

When the distance L1 is less than 25% of the section height, strain amplitude of the sidewall portion 3 is prone to increase. When the distance L1 is greater than 35% of the section height, the cushion rubber 8 as well as the bead apex rubber 12 becomes small, thus deteriorating impact absorbing property.

Preferably, the chafer rubber 13 has complex modulus E*6 of from 10 to 15 MPa. Generally, in the bead portions 4 configured as an ultra-high turn-up carcass structure, influence of strain of radially outward of the carcass ply 6A tends to concentrate on the chafer rubber 13. The chafer rubber 13 as mentioned above can disperse strain acting on the chafer rubber 13 effectively.

In this embodiment, in each bead portion 4, the chafer rubber 13 is disposed radially inward of the sidewall rubber 11 and axially outwardly of the turn-up portion 6b. On the straight line SL that is perpendicular to the main portion 6a and passes the radially inner end 11a of the sidewall rubber 11, the chafer rubber 13 has a thickness t2 of from 40% to 60% of a thickness t3 of the bead portion 4.

When the thickness t2 of the chafer rubber 13 is less than 40% of the thickness t3 of the bead portion 4, dispersion of strain in the chafer rubber 13 is insufficient, and thus deformation of the bead portion 4 may increase. When the thickness t2 of the chafer rubber 13 is greater than 60% of the thickness t3 of the bead portion 4, strain between the chafer rubber 13 and the turn-up portion 6b increase, and therefore these may be separated from each other.

Preferably, the chafer rubber 13 includes a bead toe portion 13a located radially innermost of the tire, a bead base portion 13b extending axially outwardly from the bead toe 13a, and a bead heel portion 13c located axially outermost of the bead base portion 13b. Thus, the bead base portion 13b of chafer rubber 13 according to the embodiment is configured to be in contact with a rim seat of a standard wheel rim.

Each bead core 5, for example, has a polygonal cross-section which is formed by winding a steel bead wire repeatedly in tire axial and radial directions. In this embodiment, the bead cores 5 has a hexagonal cross-sectional shape. The bead core 5 has a bead core reference position 5a which is located radially innermost thereof.

Preferably, an axial distance L2 between the bead toe portion 13a and the bead core reference position 5a is in a range of from 30%9 to 40% of an axial distance 13 between the bead toe portion 13a and the bead heel portion 13c. When the distance L2 is less than 30% of the distance 13, a thickness of an axially inner portion of the bead cores 5 is prone to be small, being difficult to manufacture. When the distance L2 is more than 40% of the distance 13, it may be difficult to mount on a standard wheel rim (not illustrated). Note that the distance L3 corresponds to an axial distance of the bead base portion 13b.

Preferably, the bead core 5 includes a core main body 5A formed by the bead cord and a wrapping layer 5B surrounding the core main body 5A. The wrapping layer 5B, for example, is configured by a campus cloth made of organic fiber, e.g., nylon and the like, to fix the bead core.

While the particularly preferable embodiments of the heavy-duty pneumatic tire 1 in accordance with the present disclosure have been described in detail, the present disclosure is not limited to the illustrated embodiments but can be modified and carried out in various aspects.

Example

Heavy-duty pneumatic tires of 315/45 R22.5 having a basic structure as shown in FIG. 1 were manufactured by way of trial based on the specification in Table 1. Then, bead durability of each test tire was tested. The common specification of each test tire and the test methods are as follows:
rim: 22.5×9.75, and
tire inner pressure: 900 kPa.

Bead Durability Test 1:

Each test tire was made to run on a drum tester at speed of 20 km/h with a 200% of a standard tire load, and then running time that the tire was able to run without having any damage on the bead portions was measured. The test results are shown in Table 1 using an index based on a certain reference time being 100. The larger value indicates the better bead durability.

Bead Durability Test 2:

After hardening the carcass ply of each test tire by oxygen degradation, each test tire was made to run at speed of 20 km/h with a 150% of a standard tire load to measure running time that the tire was able to run without having any damage on the bead portions. The test results are shown in Table 1 using an index based on a certain reference time being 100. The larger value indicates the better bead durability.

Table 1 shows the test results.

TABLE 1

|  | Ref. 1 | Ref. 2 | Ref. 3 | Ex. 1 | Ex. 2 | Ex. 3 | Ex. 4 |
| --- | --- | --- | --- | --- | --- | --- | --- |
| Ultra-high turn-up carcass structure(*) | N | Y | Y | Y | Y | Y | Y |
| Chafer rubber thickness t2/bead portion thickness t3 (%) | 50 | 30 | 70 | 50 | 50 | 50 | 50 |
| Distance L1 between cushion rubber and bead apex rubber/section height (%) | 25 | 30 | 30 | 30 | 18 | 18 | 30 |
| Steel carcass cord diameter (mm) | 0.9 | 0.7 | 0.7 | 0.7 | 0.7 | 1.0 | 0.7 |
| Distance L2 between bead toe and bead reference position/axial distance L3 of bead base (%) | 35 | 35 | 35 | 35 | 50 | 50 | 50 |
| Bead durability test 1 (index) | 20 | 20 | 10 | 100 | 100 | 100 | 100 |
| Bead durability test 2 (index) | 60 | 60 | 60 | 100 | 80 | 60 | 70 |

(*)N: not applied, and Y: applied

It is confirmed that the example tires have improved bead durability.

What is claimed is:

1. A heavy-duty pneumatic tire comprising:
a section width being equal to or less than 335 mm;
an aspect ratio being equal to or less than 55%;
a toroidal carcass extending between axially spaced bead portions through a tread portion and sidewall portions, wherein the carcass comprises a carcass ply comprising a main portion extending between bead cores each disposed in a respective one of the bead portions through the tread portion and the sidewall portions, and a turn-up portion turned up around each bead core of each bead portion from axially inside of the tire to outside of the tire and extending to a radially outer end thereof;
a belt layer disposed radially outward of the carcass in the tread portion, wherein the radially outer end of the turn-up portion is located between the main portion and the belt layer in the tread portion, wherein
the belt layer comprises first, second, third and fourth belt plies superimposed in this order from radially inside of the tire,
the second belt ply comprises an axially outer edge that is located axially outwardly of an axially outer edge of the first belt ply, in a tire half cross-section with respect to a tire equator;
a sidewall rubber defining an outer sidewall profile of each sidewall portion, the sidewall rubber having complex modulus $E*4$ of from 3.0 to 5.5 MPa; and
a chafer rubber defining an outer bead profile of each bead portion, wherein in each bead portion, on a straight line that is perpendicular to the main portion of the carcass ply and passes a radially inner end of the sidewall rubber, the chafer rubber has a thickness of from 40% to 60% of a thickness of the bead portion, wherein
in the tire half cross-section, the radially outer end of the turn-up portion of the carcass ply, in the tire axial direction, is located between the axially outer edges of the first belt ply and the second belt ply.

2. The heavy-duty pneumatic tire according to claim 1, wherein the chafer rubber has complex modulus of from 10 to 15 MPa.

3. The heavy-duty pneumatic tire according to claim 1, wherein
the chafer rubber comprises a bead toe portion located radially innermost of the tire, a bead base portion extending axially outwardly from the bead toe, and a bead heel portion located axially outermost of the bead base portion,
each bead core has a bead core reference position which is located radially innermost thereof, and
in each bead portion, an axial distance between the bead toe portion and the bead core reference position is in a range of from 30% to 40% of an axial distance between the bead toe portion and the bead heel portion.

4. The heavy-duty pneumatic tire according to claim 1, wherein the carcass ply comprises steel cords having a cord diameter of from 0.6 to 0.8 mm.

5. The heavy-duty pneumatic tire according to claim 4, wherein the steel cords are arranged so as to have from 20 to 30 ends per 50 mm width of the carcass ply.

6. The heavy-duty pneumatic tire according to claim 1, further comprising
a cushion rubber disposed between the main portion of the carcass ply and each edge of the belt layer, wherein
the cushion rubber extends to a radially inner end thereof located radially inwardly of the radially outer end of the turn-up portion.

7. The heavy-duty pneumatic tire according to claim 6, further comprising
a tapered bead apex rubber in each bead portion, wherein
the bead apex rubber extends radially outwardly from the bead core to a radially outer end thereof between the main portion and the turn-up portion, and
in each bead portion, a radial distance between the radially inner end of the cushion rubber and the radially outer end of the bead apex rubber is in a range of from 25% to 35% of a product of the section width and the aspect ratio.

8. The heavy-duty pneumatic tire according to claim 7, wherein in each bead portion, the radially outer end of the bead apex rubber is located radially outwardly of the straight line.

9. The heavy-duty pneumatic tire according to claim 8, wherein
the chafer rubber has complex modulus $E*6$ of from 10 to 15 MPa and a radially outer end, and
in each bead portion, the radially outer end of the bead apex rubber is located radially inwardly of the radially outer end of the chafer rubber.

10. The heavy-duty pneumatic tire according to claim 1, wherein the radially outer end of the sidewall rubber is located radially outwardly of the axially outer end of the second belt ply and radially inwardly of an axially outermost edge of the tread portion.

11. The heavy-duty pneumatic tire according to claim 9, wherein the radially outer end of the sidewall rubber is located radially outwardly of the axially outer end of the second belt ply and radially inwardly of an axially outermost edge of the tread portion.

12. The heavy-duty pneumatic tire according to claim 1, wherein a boundary line between the sidewall rubber and the chafer rubber has an arc shaped protruding radially inwardly.

13. The heavy-duty pneumatic tire according to claim 9, wherein a boundary line between the sidewall rubber and the chafer rubber has an arc shaped protruding radially inwardly.

14. The heavy-duty pneumatic tire according to claim 10, wherein a boundary line between the sidewall rubber and the chafer rubber has an arc shaped protruding radially inwardly.

15. The heavy-duty pneumatic tire according to claim 14, wherein the outer end of the sidewall rubber is exposed at an axially outer surface of one of the sidewall portions.

* * * * *